US006852408B2

(12) United States Patent
Hansen et al.

(10) Patent No.: US 6,852,408 B2
(45) Date of Patent: Feb. 8, 2005

(54) MASKING DEVICE AND METHOD

(75) Inventors: Daniel Hansen, Los Angeles, CA (US); Brian J. Kramer, Los Angeles, CA (US)

(73) Assignee: E-Z Mask, Inc., Los Angeles, CA (US)

( * ) Notice: Subject to any disclaimer, the term of this patent is extended or adjusted under 35 U.S.C. 154(b) by 108 days.

(21) Appl. No.: 10/094,575

(22) Filed: Mar. 8, 2002

(65) Prior Publication Data

US 2003/0170451 A1 Sep. 11, 2003

(51) Int. Cl.[7] ............................ B32B 7/12; B32B 15/04

(52) U.S. Cl. ...................... 428/343; 428/40.1; 428/194; 428/355 RA; 427/282; 118/504; 118/505

(58) Field of Search ............................... 428/40.1, 194, 428/343, 355 RA; 427/282; 118/504, 505

(56) References Cited

U.S. PATENT DOCUMENTS

| | | | | |
|---|---|---|---|---|
| 2,045,597 A | | 6/1936 | Haug | |
| 3,752,304 A | | 8/1973 | Alef | |
| 4,313,970 A | * | 2/1982 | Jones et al. | 427/56.1 |
| 4,397,261 A | | 8/1983 | Jones | |
| 4,420,520 A | | 12/1983 | Jones et al. | |
| 4,789,579 A | | 12/1988 | Tutas et al. | |
| 4,826,912 A | * | 5/1989 | Ko et al. | 524/567 |
| 5,441,769 A | | 8/1995 | Ross | |
| 5,494,519 A | | 2/1996 | Jeffrey, Jr. | |
| 5,623,740 A | | 4/1997 | Burns et al. | |
| 5,800,894 A | | 9/1998 | Navis | |
| 6,315,831 B1 | | 11/2001 | Renetta | |
| 6,579,587 B2 | | 6/2003 | Schnoebelen, Jr. | 428/40.1 |
| 2002/0004133 A1 | | 1/2002 | Nakib | |
| 2003/0035915 A1 | | 2/2003 | Schnoebelen, Jr. | 428/40.1 |

* cited by examiner

*Primary Examiner*—Daniel Zirker
(74) *Attorney, Agent, or Firm*—Baniak Pine & Gannon

(57) ABSTRACT

A masking device including a substantially rigid body, the body having an underside and adjoining first and second edges and an adhesive portion positioned on the underside adjacent to one or more of the first and second edges.

17 Claims, 5 Drawing Sheets

MASKING DEVICE AND METHOD

FIELD OF THE INVENTION

The apparatus and method of the present invention relates to the field of painting. In particular, the present invention relates to a masking apparatus for use in preventing unwanted paint from adhering to a surface, such as a window or a wall surface and a method of using the apparatus.

BACKGROUND OF THE INVENTION

Painters typically protect windows and other surfaces before applying paint to adjacent areas by the use of a covering referred to as masking. One example of masking is masking tape. Before painting an area, such as a wall, ceiling, wood trim or the like, the surface that is to be protected from paint is covered by dispensing lengths of masking tape from a roll or dispenser and applying the length of masking tape to the surface adjacent the area to be painted.

For example, if an area of wood trim of a window frame adjacent a glass windowpane is to be painted, a portion of the glass window surface adjacent the trim is covered with masking tape to prevent paint from coming into contact with the glass surface. In this example, masking tape would be dispensed from a roll and preferably fitted along the edges and corners of the glass windowpane adjacent the wood trim. The process of fitting the masking tape into along the windowpane and particularly into the corners thereof can be especially difficult and is time-consuming if a worker wishes to do quality work. In fact, the process of masking and otherwise preparing surfaces for painting can be more time-consuming than the actual painting itself. After painting, the masking tape is removed and disposed of, leaving the glass surface underneath free of paint.

To address the problem of time-consuming masking methods, reusable masks have been developed which require less labor to use. One example of such a device is a rigid paint mask for covering a window. This mask is guided into position by contact with the molding around the window, and is held in place by a suction cup mounted underneath each corner of the mask. The suction cups attach to the glass surface of the window. A primary drawback of this type of mask is that they are only cost-effective if a very large number of identical items are being painted. This is due partially to the specificity of the mask, with each mask being manufactured for one particular size and shape of window and partially to the relative expense of making these masks, all of which require either custom manufacturing or the assembly of several parts.

An example of inexpensive masking devices includes a mask made of a flexible plastic sheet. The flexible plastic sheets adhere to window surfaces due to the inherent adhesive quality of the plastic from which they are manufactured. However, because of the flexibility and thin cross-section of the sheet, they are difficult to quickly detach from a backing material and apply to a window. For the same reason, they can be difficult to reposition and remove from the glass window.

A demand exists therefore for an improved device and method for masking surfaces, which is inexpensive and easy to apply and remove. The present invention satisfies the demand.

SUMMARY OF THE INVENTION

One aspect of the present invention provides a masking device including a substantially rigid body, the body having an underside and adjoining first and second edges and an adhesive portion positioned on the underside adjacent to one or more of the first and second edges.

The masking device may include an adhesive portion that includes a pressure sensitive adhesive. The masking device adhesive portion may be formed adjacent the first and second edges as an L-shaped area. The masking device body may include an arcuate surface on the first edge. The body may include an arcuate surface on the first edge and the second edge. The body may include a stepped surface on the first edge. The masking device body may include a stepped surface on the first edge and the second edge. The masking device first edge and second edge may form a 90-degree angle. The masking device first edge and the second edge may be adapted to form an angle to match that of a corresponding corner of a windowpane. The body may include a third edge and a fourth edge, the third and fourth edges being free of adhesive. The masking device body may include a tab portion for grasping by a user. The tab portion may be formed on a corner of the body opposite the first and second edges. The body may include a first leg portion adjacent one or more of the first edge and the second edge. The adhesive portion may be positioned relatively inboard of the first leg portion. The body may include a third edge and a fourth edge and wherein a second leg portion is positioned adjacent one or more of the third edge and the fourth edge.

Another aspect of the present invention provides a deck of masking devices including a plurality of stacked masking devices. Each of the plurality of stacked masking devices includes a substantially rigid body, the body having a topside and an underside and first and second adjoining edges and an adhesive portion positioned on the underside adjacent to one or more of the first and second adjoining edges.

The deck may include a first one of the plurality of stacked masking devices positioned on top of a second one of the plurality of stacked masking devices. The adhesive portion of the first one of the plurality of stacked masking devices may be positioned in contact with the topside of the second one of the plurality of stacked masking devices. The plurality of stacked masking devices may include more than two of the masking devices. The deck may include a bottom sheet temporarily affixed to a bottom one of the plurality of stacked masking devices.

Another aspect of the present invention provides a method of masking a window or like surface. The window includes a frame to be painted and at least one windowpane positioned within the frame. The windowpane has a plurality of corners. The method includes adhering a masking device into each of the plurality of windowpane corners such that a gap is left between each of the masking devices and applying masking tape to span the gaps such that an outside edge of the windowpane is completely masked.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF THE DRAWINGS

The above-mentioned and other features and advantages of this invention, and the manner of attaining them, will be further understood by reference to the following description of an embodiment of the invention taken in conjunction with the accompanying drawings, wherein.

DETAILED DESCRIPTION OF A PRESENTLY PREFERRED EMBODIMENT

Figure 1:
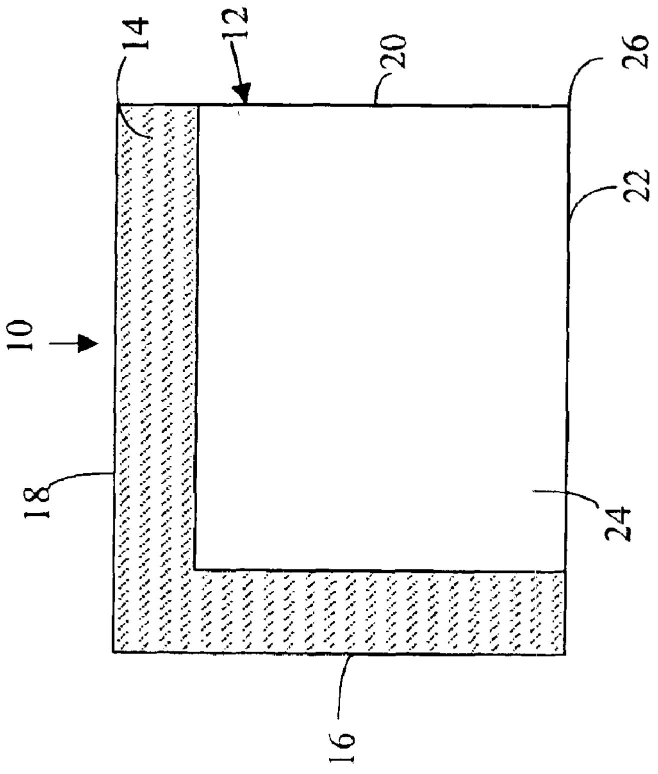
FIG. 1 shows a bottom view of one embodiment of the invention.

Beginning with the invention shown in FIG. 1, a masking device is shown generally at 10. In broad overview, the device 10 includes a body 12 and an adhesive portion 14.

The body 12 is preferably made of a rigid, substantially rigid or semi-rigid material. Examples of body material include heavy paper, cardboard, paper-polymer composites, plastic, polymeric composites, and other materials. For the purpose of the present invention, substantially rigid refers to a stiffness that falls between paper or flexible plastic films and unyieldingly rigid. It will be understood that the material from which the body is made preferably possesses paint resistant properties. The body 12 may be made of such a resistant material, coated with a paint resistant material, or otherwise provided with such a resistant material. In other words, the body 12 will resist absorbing paint or resist the penetration of paint or paint solvent through the body material and consequently coming into contact with the protected surface (not shown). The body 12 may have any suitable shape. In one embodiment, the body 12 has an overall rectangular or square shape for fitting into the corner of a windowpane. The body 12 may include a right triangle shape, sized to fit into a window corner. Depending on the surface to be masked, the body 12 may have other shapes such as angled or curvilinear.

As will be explained more fully below, when used in a windowpane, the size of the body 12 is preferably less than half the dimension of the windowpane to which it is attached. Preferably, the body 12 is sized such that four individual devices are used in a windowpane without overlapping. For example, if a windowpane is being masked which glass measures 18"×12", each mask device 10 may be sized 4"×4", for example, such that when four masking devices are used, there is effective masking of the corners, some coverage of the windowpane glass surface and no overlap therebetween.

The adhesive portion 14 is positioned on an underside 24 of the body 12. One embodiment of the present invention contemplates the use of a pressure sensitive adhesive that adheres to a window pane or the like in such as fashion as to be easily removed upon completion of the painting task. In other words, the adhesive 14 should not permanently affix the body 12 to the protected surface, mar the surface or otherwise cause a defacement of the protected surface contacted. Other suitable adhesives may be used, so long as they include the property of providing temporary adhesion of the device 10 to a surface. In one embodiment, the adhesive portion 14 does not have a significant cross-sectional thickness. The adhesive portion 14 may thus be a thin layer or area of adhesive material, double-sided adhesive tape or the like.

In one embodiment of the invention, the adhesive portion 14 is applied or positioned adjacent to or along two adjoining edges 16, 18 of the body 12. The adhesive portion 14 may be in the form of strips of adhesive material or an adhesive area. The two adjoining edges 16, 18 are positioned in a corner of a windowpane and pressed to affix the adhesive 14 onto the glass of the windowpane. The two free edges 20, 22 opposite the adjoining edges 16, 18 are free of adhesive so that a user may easily slip a digit or tool underneath the free edges and remove the body 12 from the protected surface after painting is completed, by prying or levering, for example. The edges 16, 18, 20, 22 may be tapered or angled or curved as well as perpendicular to the underside 24 or topside 32 of the body 12.

The adhesive portion 14 may be applied to other portions of the underside 24 of the body 12. The adhesive portion 14 is positioned in such a fashion to leave a free corner 26 free of adhesive to facilitate removal of the body 12 after use.

Figure 2:
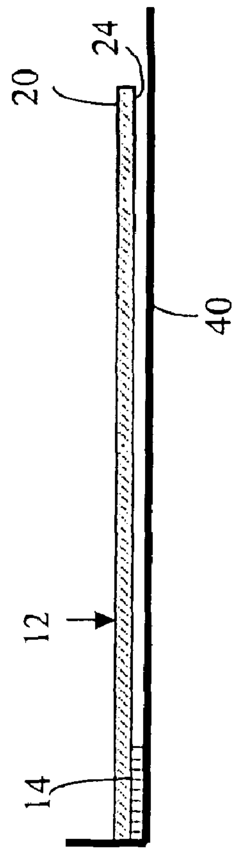
FIG. 2 shows a cross-sectional view of FIG. 1.

As shown best in FIG. 2, the body 12 may be a flat, thin planar body in cross-section. The adhesive portion 14 is shown positioned along one of the adjoining edges 16. It will be understood that the thickness of the adhesive portion 14 is exaggerated for illustrative purposes.

Figure 3:
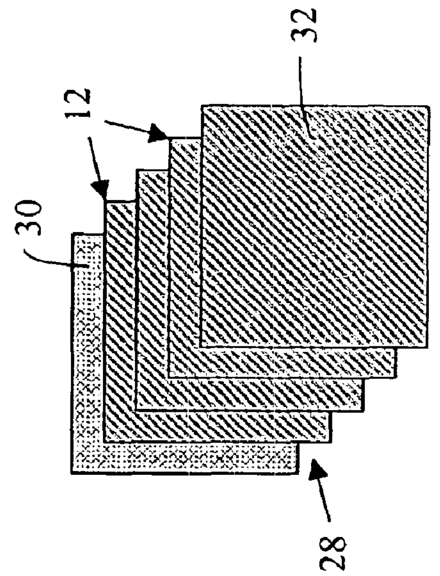
FIG. 3 shows a top exploded view of five masking devices of the present invention in a stack configuration.
Figure 4:
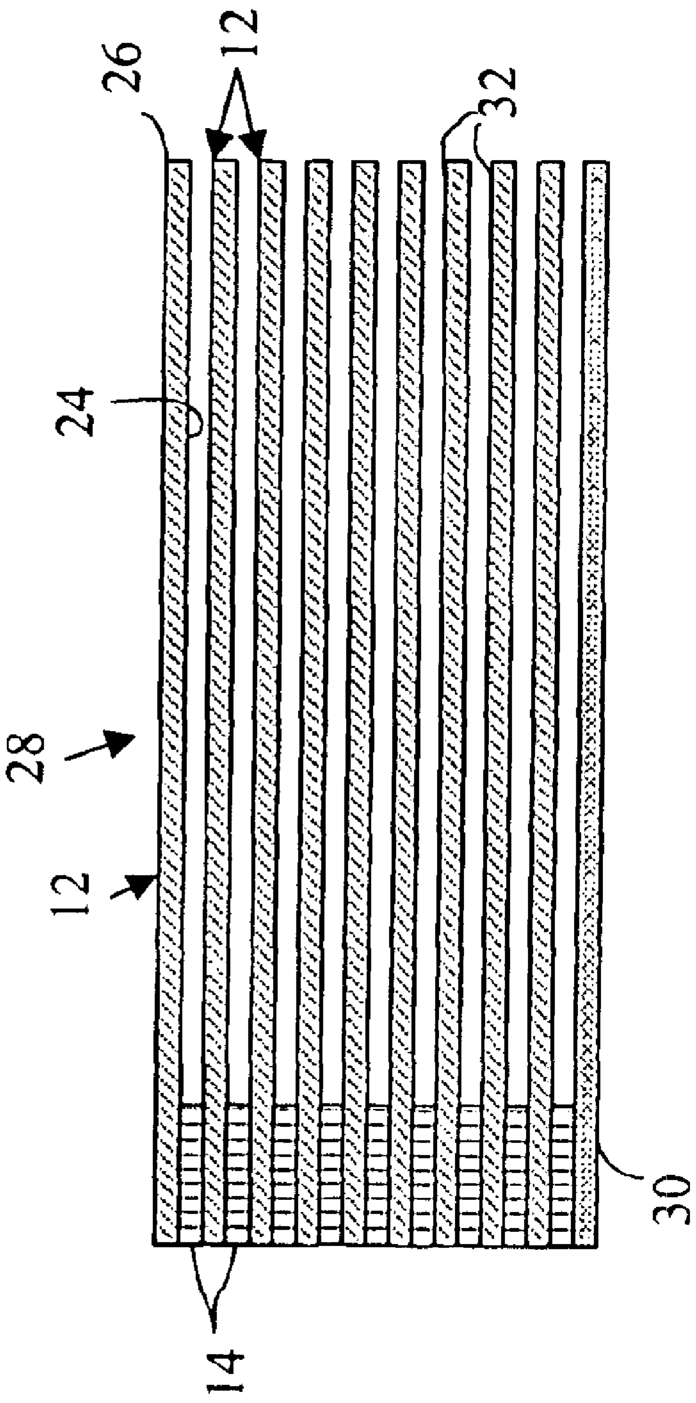
FIG. 4 shows a cross-sectional view of a stack or deck of the masking devices.

In a preferred embodiment, as shown in FIGS. 3 and 4, a plurality of bodies 12 are stacked into a deck 28 to save space, for example, and provide a simple method of shipping, storing, carrying and dispensing bodies when performing a masking operation. The adhesive portions 14 on the bodies 12 adhere to topside 32 of an adjacent body to form the stacked deck 28. A protective sheet 30 may be used on the underside 24 of the 12 to protect the adhesive portion thereon from becoming fouled with dust and other contaminants. The protective sheet 30 should be easily removed from the adhesive portion. Since, the thickness of the adhesive portion 14 is exaggerated for illustrative purposes, it will be understood that when stacked into a deck-like configuration as shown, there will little or no gap between adjacent devices in the deck 28. In this manner, the devices are efficiently stored and transported. Due to the substantially rigid nature of each of the device bodies 12, the devices are easily separated from the deck 28.

Figure 5:
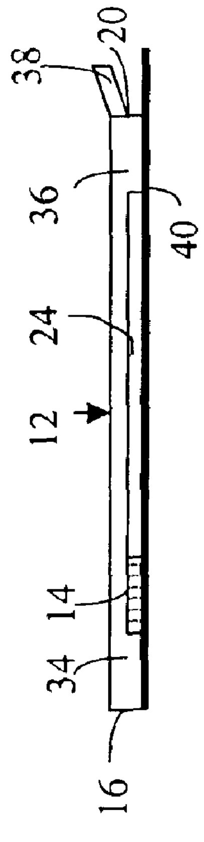
FIG. 5 shows another embodiment of the present invention in a cross-sectional view.
Figure 6:
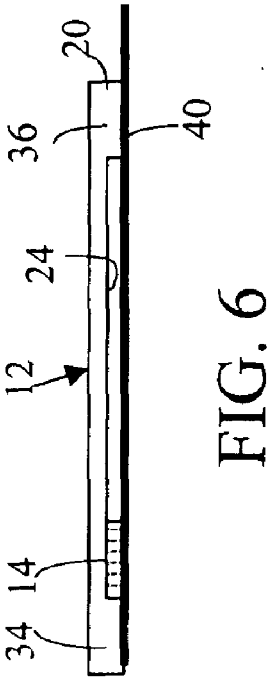
FIG. 6 shows another embodiment of the present invention in a cross-sectional view.

Turning to FIGS. 5 and 6, the body 12 may include a pair of legs 34, 36, which serve to space the body 12 from the protected surface 40. The legs 34, 36 may be extended or raised portions of the body 12 or the like. It will be understood that the protected surface 40 may be a windowpane, a wall surface, or any surface that is masked to prevent adherence of paint to the protected surface. The legs 34, 36 are shown exaggerated for illustration purposes. A first leg 34 depends from the underside 24 of the body 12 outboard from the adhesive portion 14. A second leg 36 may depend from the underside 24 of the body adjacent one or more of the free edges 20, 22. The adhesive portion 14 should extend sufficiently from the underside 24 to contact the protected surface 40. A tab feature 38 (see FIG. 5) may be provided the free edge 20 to facilitate grasping by a user for easy removal of the device 10 from the protected surface 40.

Figure 7:
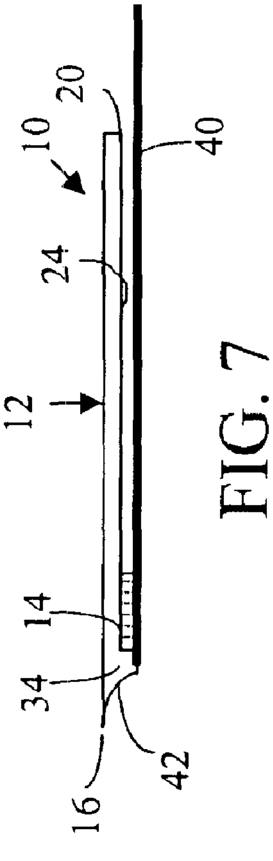
FIG. 7 shows another embodiment of the present invention and a cross-sectional view.

Turning to FIG. 7, an embodiment of the device 10 is shown with the first adjoining edge 16 including an arcuate surface 42. The arcuate surface 42 is sized and shaped to contact a corresponding adjacent curved surface (not shown) of a window frame or the like without gaps. The curved surface may be a portion of a window frame or a bead of window caulk or silicon material (not shown). The adhesive portion 14 may be positioned adjacent and inboard from the first leg 34 and extends from underside 24 sufficiently to contact protected surface 40.

Figure 8:
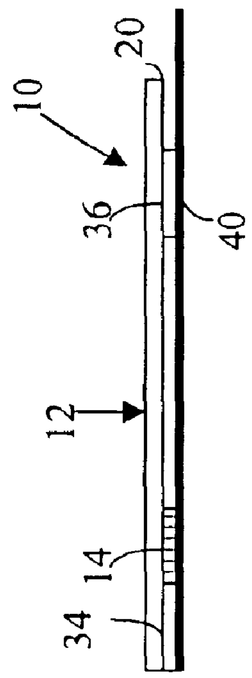
FIG. 8 shows another embodiment of the present invention in a cross-sectional view.
Figure 9:
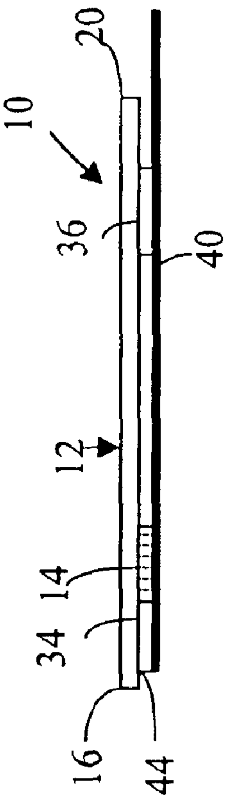
FIG. 9 shows another embodiment of the present invention in a cross-sectional view.

FIGS. 8 and 9 illustrate another embodiment of the device 10 of the present invention wherein the body 12 includes a first leg 34 and a second leg 36. The second leg 36 is positioned inboard from the first free edge 20 to position the first free edge 20 above the protected surface 40. In this manner, the first free edge 20 is easily graspable by the user and the device 10 is easily positioned and removed from the protected surface 40. FIG. 9 illustrates an embodiment of the device 10 of the present invention where the first leg 34 is positioned inboard from the first adjoining edge 16 to create a stepped surface 44. Similar to the arcuate surface of the device in FIG. 7, the stepped surface is sized and shaped to conform or cooperate with a corresponding surface of the windowpane or the like which the device 10 is positioned against.

Figure 10:
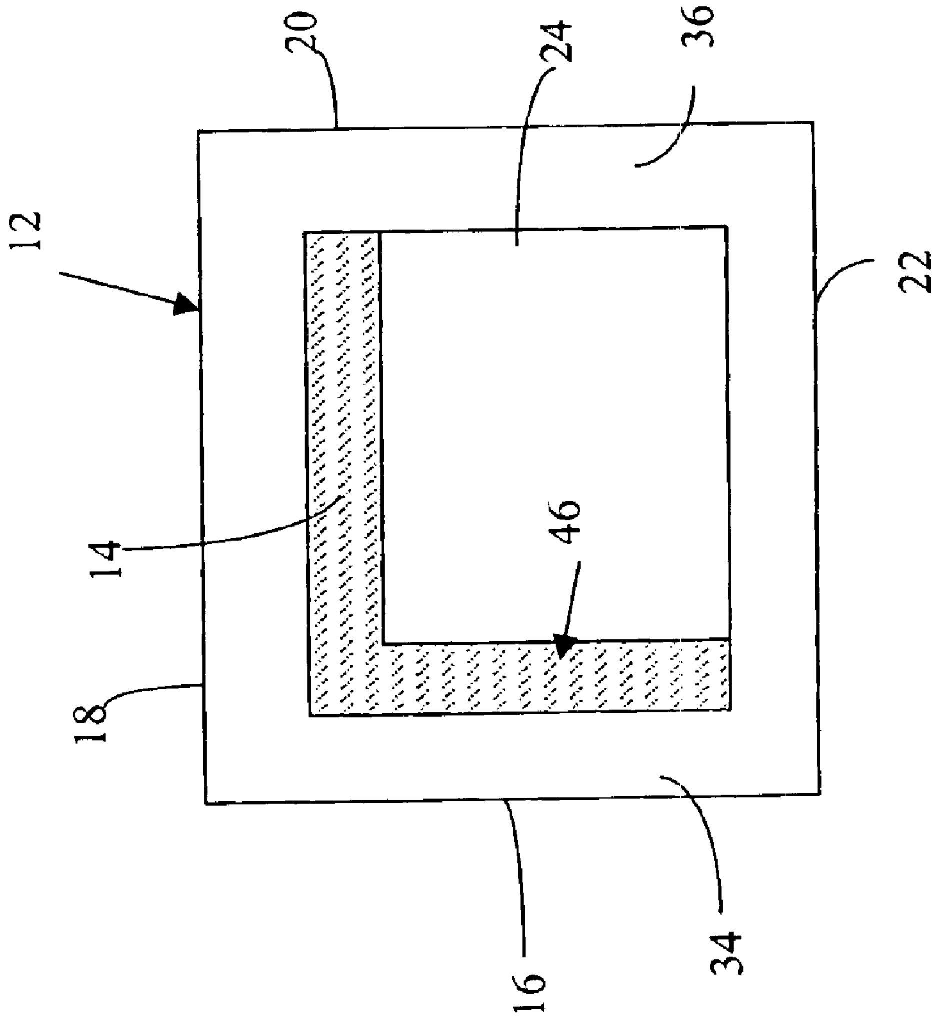
FIG. 10 shows a bottom view of the invention of FIG. 8.

FIG. 10 illustrates the position of the adhesive portion 14 on the underside 24 of the body 12 when elements (legs 34, 36, for example) of the device 10 are positioned at or near the edges 16, 18, 20, 22. In this embodiment, the adhesive portion 14 is an "L" shaped area 46, which parallels the first and second adjoining edges 16, 18.

Figure 11:
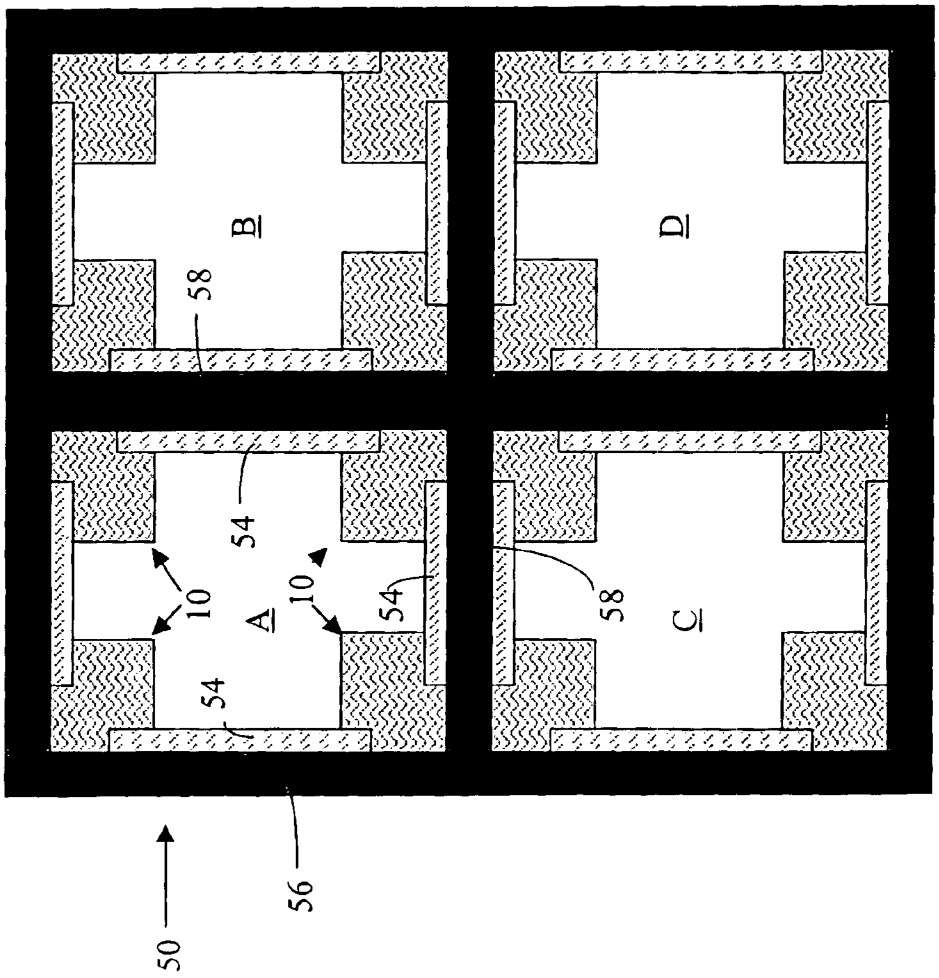
FIG. 11 shows an embodiment of a method of the present invention.

FIG. 11 illustrates one embodiment of a method of using the masking devices 10 of the present invention. A plurality of masking devices 10 may be used in masking a window 50. It will be understood that the present invention is not limited to masking windowpane corners. The device 10 may be used in masking other surfaces for example, such as corners of a wall surface or a ceiling, floor, moldings, furniture or the like.

The exemplary window 50 includes four glass windowpanes A, B, C, D. One masking device 10 is applied to each corner of each of the windowpanes A, B, C, D. The devices 10 are of a shape to conform to the corners of the windowpanes and of a size so as to avoid overlap. After the masking devices 10 cover each corner of each of the windowpanes, conventional masking tape 54 can be used to mask the windowpane between the masking devices. It can be seen that the masking device 10 and masking tape 54 mask the windowpane adjacent the window frame members 56 or the window grid members 58. After painting the window frame members 56 and the grid members 58, the masking devices 10 and masking tape 54 may be removed. It may be possible to reuse the masking devices 10 in subsequent masking operations. However, it may be preferable to use the devices in a disposable fashion.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

What is claimed is:

1. A masking device for masking an area adjacent to a surface to be painted to prevent paint from contacting the area when the surface is painted, comprising:

a substantially rigid body, said body including an underside, a first outer edge and a second outer edge, said first outer edge and said second outer edge meeting at a first corner;

said body further including a third outer edge and a fourth outer edge, said third outer edge and said fourth outer edge meeting at a second corner, said second corner opposite said first corner, said body further including an adhesive portion disposed on said underside along a majority of said first and second outer edges, said body further including a non-adhesive area on said underside, said non-adhesive area extending along a majority of said third and fourth outer edges.

2. The masking device of claim 1 wherein said adhesive portion is disposed on said underside along said majority of said first and second outer edges as an L-shaped area.

3. The masking device of claim 2 wherein said non-adhesive area is greater than said L-shaped area.

4. The masking device of claim 3 wherein said adhesive portion is comprised of a continuous band along said majority of said first and second outer edges.

5. The masking device of claim 4 wherein said body is rectangular.

6. The masking device of claim 5 wherein said non-adhesive area is rectangular.

7. The masking device of claim 1 wherein said second corner is free of adhesive.

8. The masking device of claim 1 wherein said first outer edge and said second outer edge form a 90 degree angle.

9. The masking device of claim 1 wherein said first outer edge and said second outer edge form an angle to match that of a corresponding corner of a windowpane.

10. The masking device of claim 1 wherein said body includes a tab portion for grasping by a user.

11. A deck of masking devices comprising:

a plurality of stacked masking devices, wherein each of said plurality of stacked masking devices comprises a substantially rigid body, said body including an underside, a first outer edge and a second outer edge, said first outer edge and said second outer edge meeting at a first corner;

said body further including a third outer edge and a fourth outer edge, said third outer edge and said fourth outer edge meeting at a second corner, said second corner opposite said first corner, said body further including an adhesive portion disposed on said underside along a majority of said first and second outer edges, said body further including a non-adhesive area on said underside, said non-adhesive area extending along a majority of said third and fourth outer edges.

12. The deck of masking devices of claim 11 wherein said deck includes a first one of said plurality of stacked masking devices positioned on top of a second one of said plurality of stacked masking devices.

13. The deck of masking devices of claim 12 wherein said adhesive portion of said first one of said plurality of stacked masking devices contacts said topside of said second one of said plurality of stacked masking devices.

14. The deck of masking devices of claim 12 wherein said plurality of stacked masking devices includes more than two said masking devices.

15. The deck of masking devices of claim 12 wherein a bottom sheet is temporarily affixed to a bottom one of said plurality of stacked masking devices.

16. A method of masking a window, the window including a frame to be painted and at least one windowpane positioned within the frame, the windowpane having a plurality of corners comprising:

providing a substantially rigid masking device, the substantially rigid masking device including an underside, a first edge and a second edge, the first edge and the second edge meeting at a first corner and an adhesive positioned on a portion of the underside and along at least one of the first and second edges;

adhering one substantially rigid masking device into each of the plurality of windowpane corners such that a gap is left between each adjacent substantially rigid masking device; and applying masking tape to span the gaps such that an outside edge of the windowpane is completely masked.

17. A method of masking a surface, the surface including a plurality of corners and edges to be masked comprising:

providing two or more masking devices, each of the two or more masking devices including a substantially rigid body including an underside, a first edge and a second edge, the first edge and the second edge meeting at a common corner and an adhesive portion positioned on the underside and along a major portion of a length of one or both of the first and second edges;

adhering one of the two or more masking devices into each of the plurality of corners such that a gap is left between each of the masking devices; and applying masking tape to span the gaps along the edges of the surface.

* * * * *